United States Defensive Publication [19] (H) [11] T974,002

Blatzer [43] Sep. 5, 1978

[54] APPARATUS AND METHOD FOR ELECTRICALLY HEATING A MOVING WIRE CONTAINING TREATING AGENTS

[75] Inventor: Bruce T. Blatzer, Peoria, Ill.

[73] Assignee: Caterpillar Tractor Co., Peoria, Ill.

[21] Appl. No.: 855,036

[22] Filed: Nov. 25, 1977

[51] Int. Cl.[2] ..... C21D 9/62

[52] U.S. Cl. ..... 219/155; 219/162

[57] ABSTRACT

An apparatus electrically heats a wire containing treating agents to a preselected temperature while controllably passing the heated wire into molten metal of a mold. The apparatus includes an insulated guide tube which has inlet and outlet contact orifices and wire feed apparatus for urging the wire through the guide tube at a preselected rate. A power supply is connected to the inlet and outlet contact orifices and the wire is in contact with the inlet and outlet orifices and forms an electric circuit. The circuit delivers electric current to the wire of a magnitude sufficient for increasing the temperature of the wire to a preselected temperature at the outlet orifices prior to entry of the wire into the molten metal.

A method of heating the moving wire prior to entry of the wire into molten metal of a mold is provided by connecting the power supply to the wire and forming the electric circuit, urging the wire through the circuit and into the mold at a preselected rate, and heating the wire to a preselected temperature by passing electric current of a preselected magnitude through the circuit.

6 Claims, 1 Sheet Drawing,

7 Pages Specification

The file of this unexamined application may be inspected and copies thereof may be purchased (849 O.G. 1221, Apr. 9, 1968).

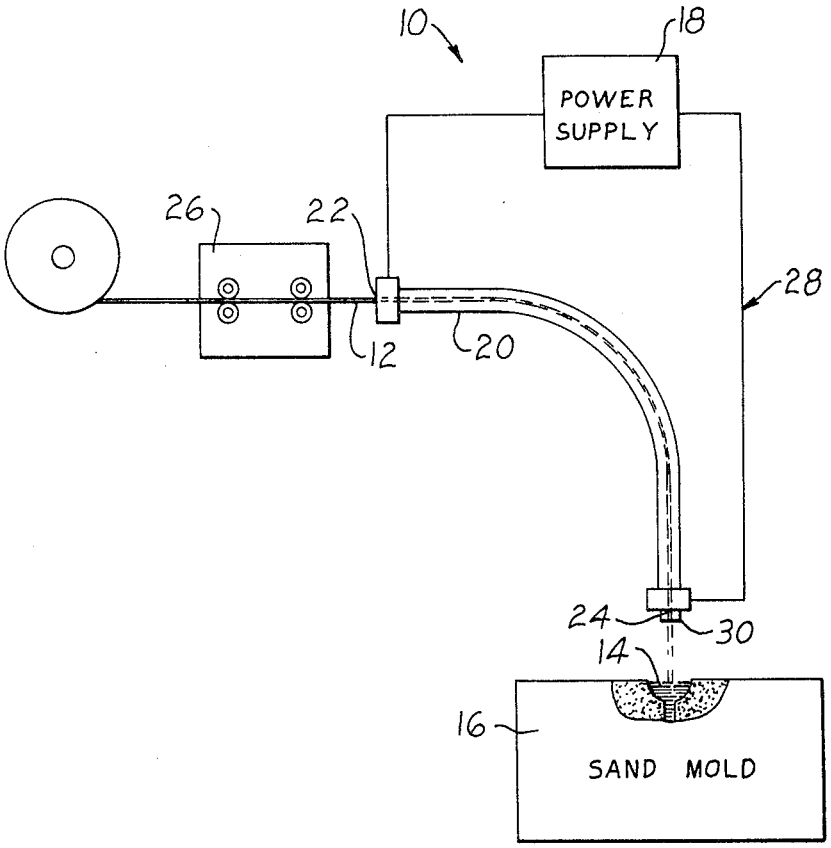

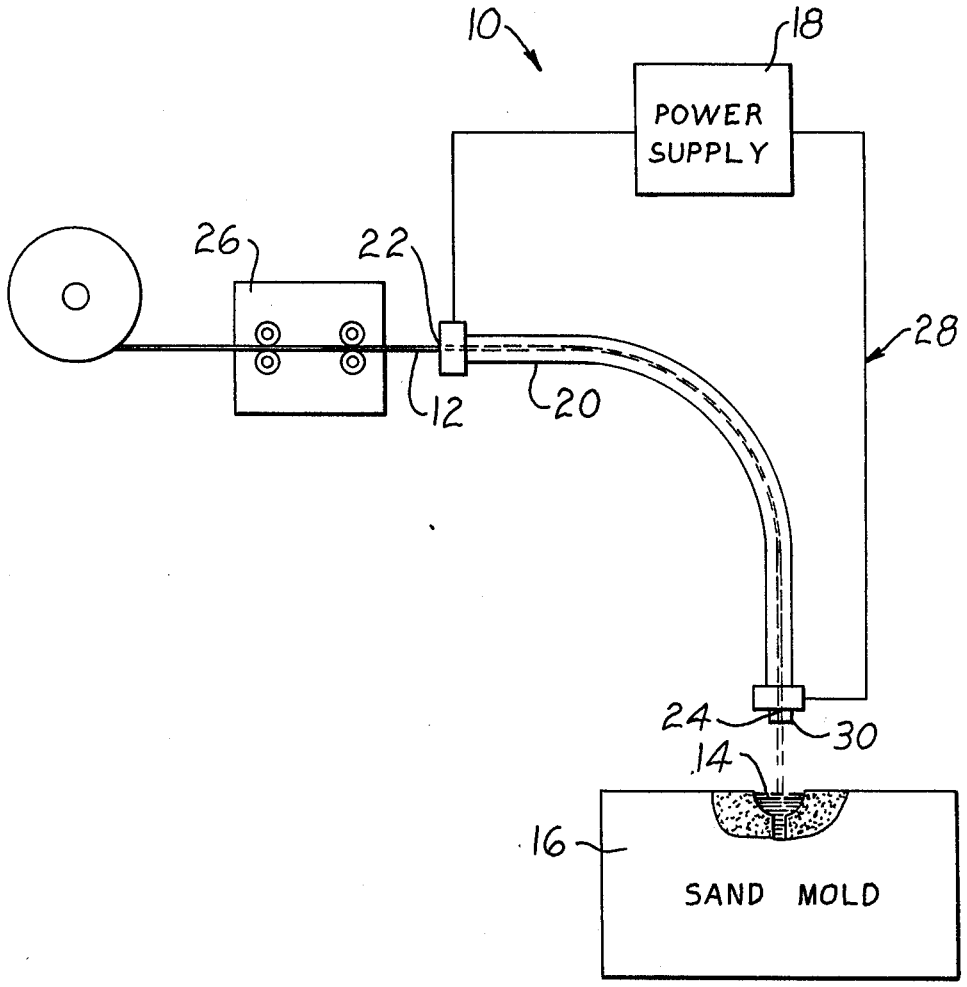
10
18
POWER SUPPLY
26
22
28
12
20
24
30
14
16
SAND MOLD